United States Patent
Jeon

(10) Patent No.: US 8,120,214 B2
(45) Date of Patent: Feb. 21, 2012

(54) LINEAR VIBRATOR WITH IMPROVED DAMPING FUNCTION

(75) Inventor: Young Jae Jeon, Gyunggi-do (KR)

(73) Assignee: Samsung Electro-Mechanics, Co., Ltd., Gyunggi-Do (KR)

( * ) Notice: Subject to any disclaimer, the term of this patent is extended or adjusted under 35 U.S.C. 154(b) by 82 days.

(21) Appl. No.: 12/538,774

(22) Filed: Aug. 10, 2009

(65) Prior Publication Data

US 2010/0277010 A1  Nov. 4, 2010

(30) Foreign Application Priority Data

May 4, 2009  (KR) .................. 10-2009-0038908

(51) Int. Cl.
*H02K 33/02* (2006.01)
*H02K 35/02* (2006.01)
*H02K 7/065* (2006.01)
*H02K 33/04* (2006.01)
*H02K 33/06* (2006.01)

(52) U.S. Cl. ............... 310/15; 310/14; 310/25; 310/36; 310/34

(58) Field of Classification Search .......... 310/314, 310/15, 25, 34, 36; H02K 33/02, 35/02, 33/08
See application file for complete search history.

(56) References Cited

U.S. PATENT DOCUMENTS

| | | | |
|---|---|---|---|
| 5,220,461 A * | 6/1993 | Inoue et al. | 359/824 |
| 6,208,237 B1 * | 3/2001 | Saiki et al. | 340/388.1 |
| 6,671,125 B1 * | 12/2003 | Sumi | 360/99.08 |
| 7,633,190 B2 * | 12/2009 | Liu et al. | 310/15 |
| 2005/0057101 A1 * | 3/2005 | Nakagawa et al. | 310/12 |
| 2005/0285454 A1 * | 12/2005 | Choi et al. | 310/14 |
| 2006/0165249 A1 * | 7/2006 | Sato | 381/374 |
| 2006/0208179 A1 * | 9/2006 | Itami | 250/234 |
| 2007/0085425 A1 * | 4/2007 | Hirashima | 310/15 |
| 2007/0194635 A1 * | 8/2007 | Miura | 310/15 |
| 2007/0241620 A1 * | 10/2007 | Ha | 310/15 |

* cited by examiner

*Primary Examiner* — Quyen Leung
*Assistant Examiner* — Terrance Kenerly
(74) *Attorney, Agent, or Firm* — Blakely Sokoloff Taylor & Zafman LLP

(57) ABSTRACT

The present invention provides a linear vibrator comprising a weight having an auxiliary magnet which is provided in a lower end of the weight and generates magnetic force with respect to the bracket. Therefore, a magnetic attractive force between auxiliary magnet and the bracket prevents undesirable fine vibrations and prevents the vibration unit from coming into direct contact with the casing.

5 Claims, 5 Drawing Sheets

LINEAR VIBRATOR WITH IMPROVED DAMPING FUNCTION

CROSS REFERENCE TO RELATED APPLICATION

This application claims the benefit of Korean Patent Application No. 10-2009-0038908, filed May 4, 2009, entitled "Linear vibrator", which is hereby incorporated by reference in its entirety into this application.

BACKGROUND OF THE INVENTION

1. Technical Field

The present invention relates to a linear vibrator.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

However, in the vibration generating unit having this structure, when the brush passes through a gap between segments of the commutator, mechanical friction, electric sparks or abrasion is induced, thus creating impurities, such as black powder, thereby reducing the lifetime of the vibration generating unit. To overcome these problems, a linear vibrator which can produce reliable linear vibration was proposed.

FIG. 1 is a sectional view of a linear vibrator according to a conventional technique.

As shown in FIG. 1, the linear vibrator 10 according to the conventional technique includes a casing 20, a bracket 30, a vibration unit 40 and a spring member 50. The casing 20 defines a space therein. The bracket 30 supports thereon a coil 32 which forms a magnetic field using an electric current applied to the coil 32. A damper member 34 is provided on the bracket 30. The vibration unit 40 includes a yoke 42 which has a hollow space therein and is closed on one end thereof, a magnet 44 which is installed in the hollow space of the yoke 42 and provided with a plate yoke 43 attached to the lower surface thereof, and a weight 46 which is fitted over the circumferential surface of the yoke 42. The spring member 50 is coupled to the upper surface of the casing 20 to elastically support the vibration unit 40 such that it linearly vibrates. The yoke 42 includes a disk part 42a and a rim part 42b which is bent downwards from the outer edge of the disk part 42a and extends a predetermined length.

In the linear vibrator 10 having the above-mentioned construction, when power is applied to the coil 32, the vibration unit 40 vibrates upwards and downwards by the spring member 50 due to interaction between a magnetic field which is generated by a magnetic circuit including the cylindrical magnet 44, the plate yoke 43 and the yoke 42, and an electric field generated by the coil 32.

However, in the case where external force is applied to the linear vibrator 10 when it is not in operation, because the vibration unit 40 is connected to the spring member 50, undesirable fine vibrations are caused which in turn cause the reliability of the linear vibrator 10 to deteriorate.

Furthermore, if an external force moves the vibration unit 40 in a horizontal direction or rotates it while it is in operation, the vibration unit 40 may come into direct contact with the casing 20, thus generating contact noise and causing parts in the interior of the linear vibrator 10 to impact each other.

SUMMARY OF THE INVENTION

The present invention has been made in an effort to provide a linear vibrator which controls undesirable and fine vibrations and prevents a vibration unit from coming into direct contact with a casing.

In a linear vibrator according to an embodiment of the present invention, a casing defines an internal space therein. A bracket is coupled to a lower end of the casing. A coil is provided on the bracket to guide a magnetic field when a current is applied to the coil. A vibration unit includes a yoke having a hollow space therein. The yoke is closed on one end thereof. A magnet is inserted into the hollow space of the yoke. A weight is fitted over an outer surface of the yoke. An auxiliary magnet is provided in a lower end of the weight. A spring member is provided in an upper end of the casing to elastically support the vibration unit such that the vibration unit linearly vibrates.

The bracket may be made of a magnetic body.

The auxiliary magnet may be provided in a perimeter of a lower surface of the weight.

Furthermore, a sidewall magnetic fluid may be interposed between the auxiliary magnet and the casing.

At least one annular depression may be formed in a circumferential inner surface of the casing, so that the sidewall magnetic fluid is received into the annular depression.

In the linear vibrator, a damper member may be provided on the bracket below the magnet to prevent the vibration unit from coming into direct contact with the bracket.

The spring member may comprise a plate spring member fastened at an outer edge thereof to an upper end of the casing while a central portion thereof is spaced apart from the casing. An upper magnetic fluid may be applied to an upper surface of the spring member at a position corresponding to the magnet. The upper magnetic fluid is set in position by a leakage flux of the annular magnet.

The coil may have a cylindrical shape such that the vibration unit linearly vibrates in the coil.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
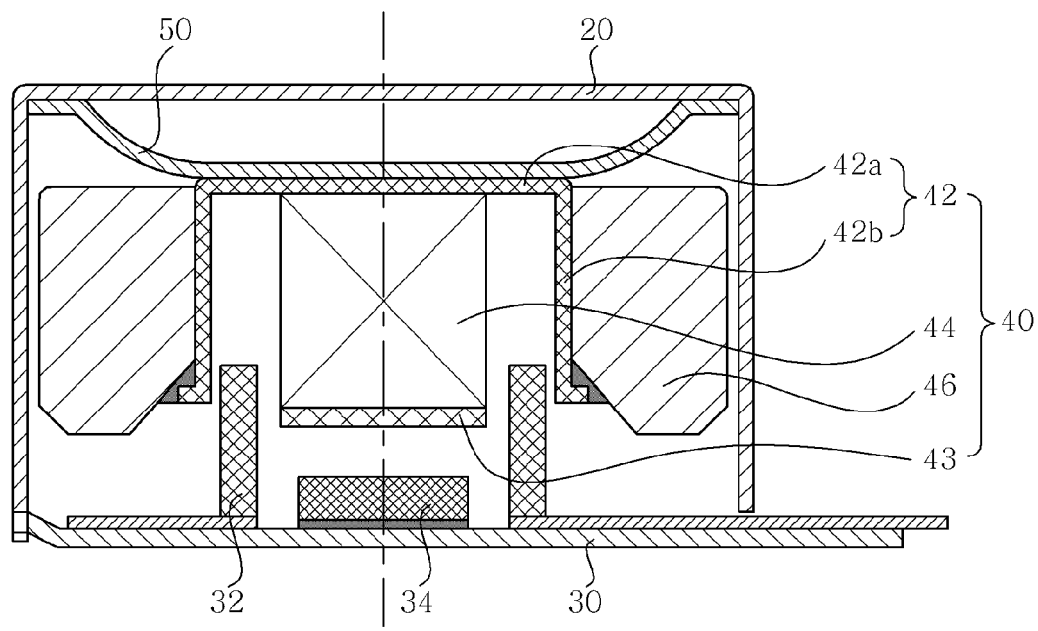
FIG. 1 is a sectional view of a linear vibrator, according to a conventional technique.

Reference now should be made to the drawings, in which the same reference numerals are used throughout the different drawings to designate the same or similar components. In the following description, when it is determined that the detailed description of the conventional function and conventional structure confuses the gist of the present invention, the description may be omitted. Furthermore, the terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Hereinafter, embodiments of the present invention will be described in detail with reference to the attached drawings.

Figure 2:
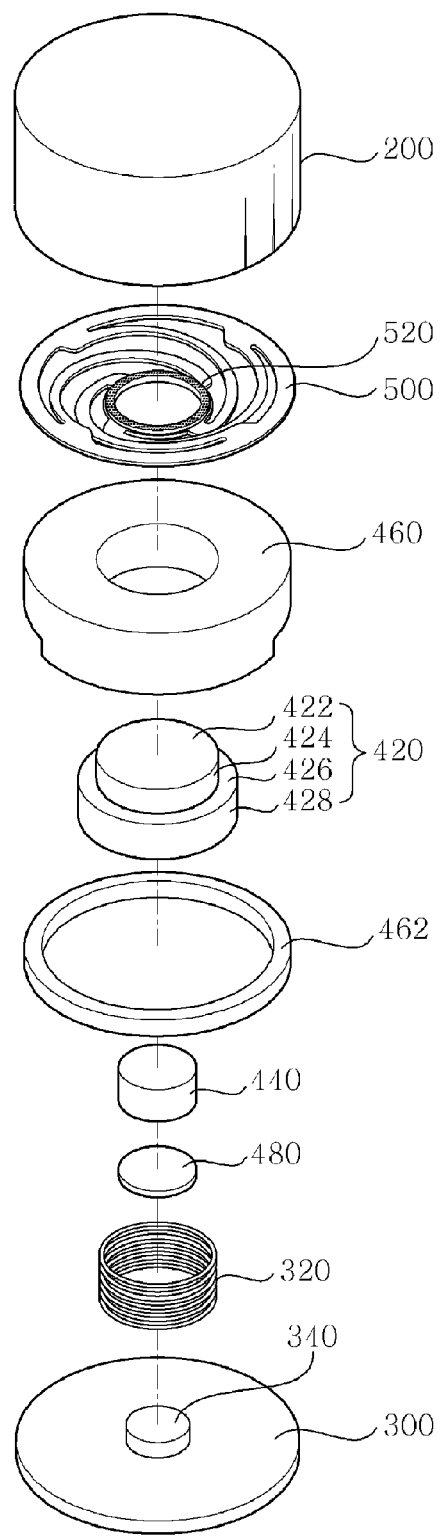
FIG. 2 is an exploded perspective view of a linear vibrator, according to a first embodiment of the present invention.
Figure 3:
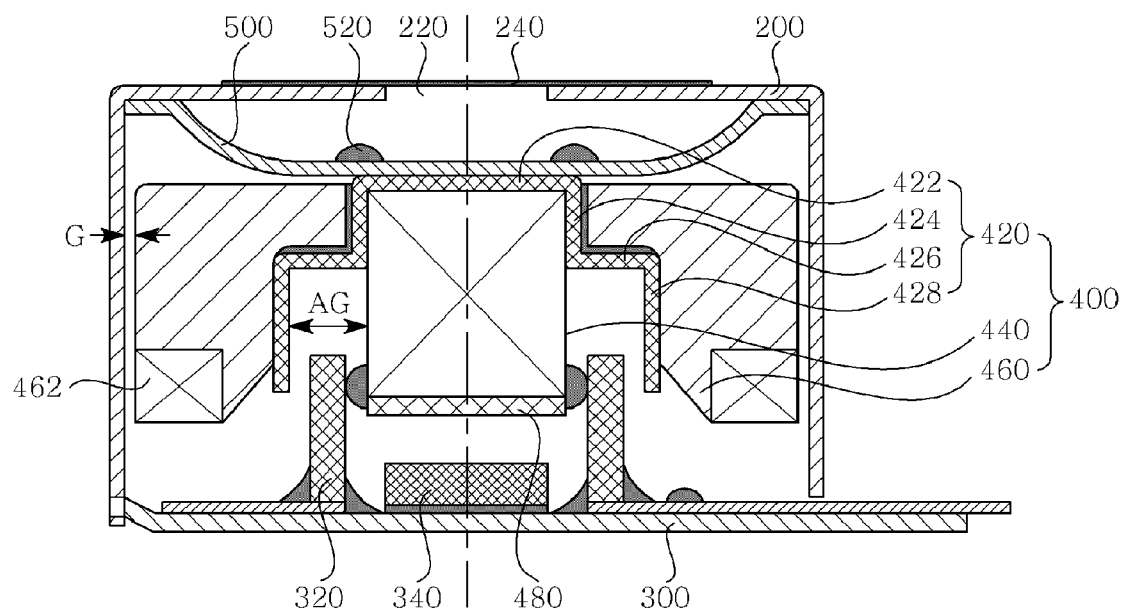
FIG. 3 is a sectional view of the linear vibrator of FIG. 2.

FIG. 2 is an exploded perspective view of a linear vibrator 100a, according to a first embodiment of the present invention. FIG. 3 is a sectional view of the linear vibrator 100a of FIG. 2. The linear vibrator 100a according to the first embodiment of the present invention will be explained with reference to FIGS. 2 and 3.

As shown in FIGS. 2 and 3, the linear vibrator 100a includes a casing 200, a bracket 300, a vibration unit 400 and a spring member 500.

The casing 200 defines an internal space for installation of elements including the vibration unit 400 therein. The casing 200 has a structure which is open on the lower end thereof. The open lower end of the casing 200 is covered with the bracket 300.

At least one injection hole 220 is formed through the upper surface of the casing 200. Upper magnetic fluid 520 is applied through the injection hole 220 to the spring member 500 provided in the casing 200. After the application of the upper magnetic fluid 520 has been completed, the upper surface of the casing 200 is sealed, for example, by a sealing tape 240 to prevent leakage of the magnetic fluid 520.

The bracket 300 is coupled to the lower end of the casing 200 to seal the space in the casing 200. A coil 320 for generating vibration is provided on the bracket 300.

The bracket 300 is made of a magnetic body such that magnetic force can be generated between it and an auxiliary magnet 462. Furthermore, the bracket 300 includes a substrate (not shown) having terminals which are electrically connected to the coil 320 to supply power to the coil 320.

The coil 320 generates an electric field of a predetermined intensity when external power is applied to the terminals of the bracket 300. The lower end of the coil 320 is bonded to the upper surface of the bracket 300 using a bonding agent.

Here, the coil 320 has a cylindrical shape which has a hollow space in which a magnet 440 of the vibration unit 400 reciprocates, that is, linearly vibrates. The upper end of the coil 320 is disposed in an air gap AG defined between the circumferential inner surface of a yoke 420 and the circumferential outer surface of the magnet 440 such that the magnetic field generated from the magnet 440 and the electric field generated from the coil 320 can smoothly interact with each other.

Meanwhile, a damper member 340 may be provided on the bracket 300 to absorb impact and prevent the vibration unit 400 from coming into direct contact with the bracket 300. In detail, the damper member 340 is provided on the bracket 300 below the magnet 440 to prevent the magnet 440 from coming into contact with the bracket 300 when it reciprocates in the hollow space of the coil 320 due to linear vibration. Here, various kinds of materials, for example, rubber, polypropylene, etc., can be used as the material of the damper member 340, and it is not limited to a special material, so long as it can satisfactorily absorb impact.

In the embodiment, protrusions (not shown) for supporting the coil 320 are provided on the bracket 300. The protrusions may be integrally formed in the bracket 300 through a pressing process. The coil 320 is assembled with the bracket 300 by fitting the coil 320 between the protrusions, thus enhancing the assemblability.

The vibration unit 400 linearly vibrates and includes the yoke 420, the magnet 440 and a weight 460.

The yoke 420 supports the magnet 440 and the weight 460 and makes the formation of the magnetic flux of the magnet 440 smooth. The yoke 420 has therein the hollow space which is open on one end thereof and closed on the other end, that is, it has a hollow cylindrical shape which is open on the upper end thereof and closed on the lower end thereof.

In detail, the yoke 420 includes a disk part 422 which is attached to the spring member 500, and a rim part which is bent downwards from the circumferential outer edge of the disk part and extends a predetermined length. The inner surface of the disk part 422 and the circumferential inner surface of the rim part form the hollow space into which the magnet 440 is inserted. Here, the rim part of the yoke 420 has a diameter larger than that of the magnet 440 such that the air gap AG is defined between the circumferential inner surface of the yoke 420 and the circumferential outer surface of the magnet 440 and the upper end of the coil 320 is disposed in the air gap AG.

The rim part of the yoke 420 has a stepped shape such that a portion thereof is tightly fitted over portion of the sidewall of the magnet 440 to increase coupling force of the magnet 440 to the yoke 420, a seating surface 426 onto which the weight 460 is seated is formed, and the air gap AG in which the upper end of the coil 320 is disposed is defined between the circumferential inner surface of the lower end of the yoke 420 and the circumferential outer surface of the magnet 440. In detail, the rim part of the yoke 420 includes a first rim portion 424 which is bent downwards from the disk part 422 and extends a predetermined length to form the hollow space for receiving a portion of the magnet 440 therein, the seating surface 426 which extends outwards from the lower edge of the first rim portion 424 to have a stepped shape, and a second rim portion 428 which is bent downwards from the seating surface 426 and extends a predetermined length.

The magnet 440 generates a predetermined intensity of magnetic field to linearly vibrate the vibration unit 400 through interaction with the coil 320. The magnet 440 is inserted into the hollow space of the yoke 420. In detail, the upper surface and an upper portion of the sidewall of the magnet 440 are inserted into the hollow space of the coil 320.

Furthermore, the magnet 440 is a cylindrical permanent magnet which is magnetized in the vertical direction to have different poles in the upper and lower parts thereof and generates a predetermined intensity of magnetic force. The magnet 440 is inserted into the hollow space of the yoke 420 and bonded to the yoke 420 by a bonding agent.

It is preferable that a plate yoke 480 be mounted to the lower surface of the magnet 440 to smoothly form magnetic flux which flows towards the open lower end of the yoke 420 via the coil 320.

The weight 460 provides a predetermined weight to the vibration unit 400 to realize linear vibration and is fitted over the outer surface of the yoke 420. An insert hole is formed through the central portion of the weight 460 so that the weight 460 can be fastened to the outer surface of the yoke 420 by inserting the yoke 420 into the insert hole of the weight 460.

Here, it is preferable that the weight 460 have an outer diameter less than an inner diameter of the casing 200 to prevent the weight 460 from coming into contact with the inner surface of the casing 200 when the vibration unit 420 linearly vibrates. In other words, a gap G is defined between the circumferential outer surface of the weight 460 and the circumferential inner surface of the casing 200.

In addition, the weight 460 is made of non-magnetic material, for example, tungsten (W), to prevent it from being affected by the magnetic force of the magnet 440.

Meanwhile, in the present invention, the auxiliary magnet 462 which generates magnetic force with respect to the bracket 300 made of a magnetic body is provided in the perimeter of the lower end of the weight 460. Using magnetic attractive force between the auxiliary magnet 462 and the bracket 300, the auxiliary magnet 462 prevents the vibration unit 400 connected to the spring member 500 from undesirably finely vibrating in response to external force. Here, a force-fitting depression into which the auxiliary magnet 462 is inserted may be formed in the perimeter of the lower end of the weight 460.

The spring member 500 elastically supports the vibration unit 400 to ensure linear motion of the vibration unit 400. For example, the spring member 500 comprises a plate spring member which is attached at the outer edge thereof to the inner surface of the upper end of the casing 200 while the central portion thereof is spaced apart from the upper plate of the casing 200.

It is preferable that the upper magnetic fluid 520 functioning as a damping member be applied to the upper surface of the spring member 500. The upper magnetic fluid 520 has the characteristic that it is collected by the magnetic flux of the cylindrical magnet 440. Hence, when the upper magnetic fluid 520 is applied to the upper surface of the plate spring member 500, it is arranged in a ring shape by leakage flux of the cylindrical magnet 440. The upper magnetic fluid 520 prevents the vibration unit 400 from coming into direct contact with the casing 200 when it vibrates upwards and downwards, thus preventing noise which may occur due to contact between the vibration unit 400 and the casing 200, and absorbing impact due to the contact.

Here, the upper magnetic fluid 520 is formed in such a way that magnetic powder is stably and evenly dispersed in liquid to have a colloidal shape and a surface active agent is added to the liquid to prevent deposition or agglutination of the magnetic powder attributable to the gravity or magnetic field. For example, magnetic fluid formed by dispersing triiron tetroxide or iron-cobalt alloy particles in oil or water is used, and, recently, magnetic fluid formed by dispersing cobalt in toluene is used. Such magnetic powder is an ultrafine particle powder ranging from 0.01 μm to 0.02 μm and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in fluid is maintained constant.

Figure 4:
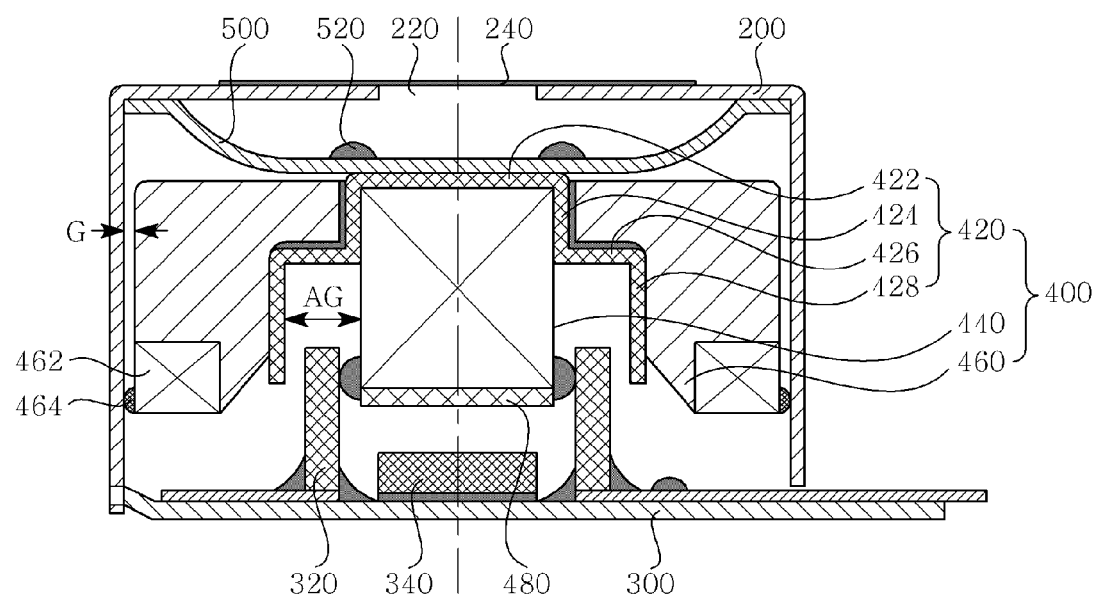
FIG. 4 is a sectional view of a linear vibrator, according to a second embodiment of the present invention.

FIG. 4 is a sectional view of a linear vibrator 100*b*, according to a second embodiment of the present invention. In the description of the second embodiment, the same reference numerals are used to designate the components corresponding to those of the first embodiment, and the explanation of the overlapped portions will be omitted.

As shown in FIG. 4, the linear vibrator 100*b* according to the second embodiment is characterized in that sidewall magnetic fluid 464 for damping is interposed between an auxiliary magnet 462 and an inner surface of a casing 200.

In detail, the sidewall magnetic fluid 464 is provided in a gap G defined between the auxiliary magnet 462 and the inner surface of the casing 200. The sidewall magnetic fluid 464 can prevent the vibration unit 400 from coming into direct contact with the casing 200 due to horizontal movement or rotation of the vibration unit 400, thereby preventing noise which may occur due to contact therebetween, and absorbing impact due to the contact.

Here, because the sidewall magnetic fluid 464 has the characteristic of being collected by the magnetic flux of the auxiliary magnet 462, it can be prevented from sliding downwards by its own weight.

Figure 5:
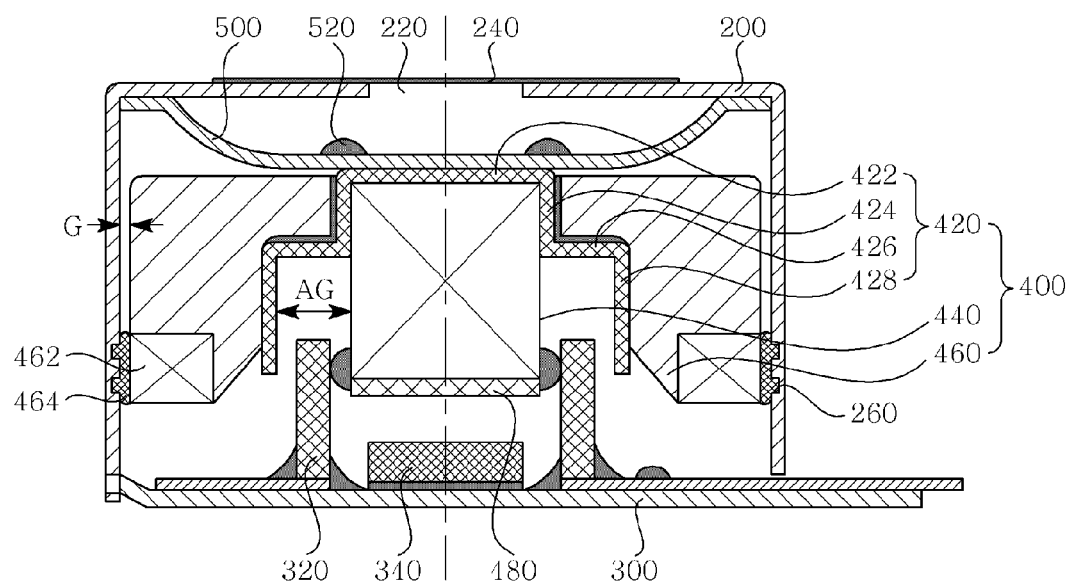
FIG. 5 is a sectional view of a linear vibrator, according to a third embodiment of the present invention.

FIG. 5 is a sectional view of a linear vibrator 100*c*, according to a third embodiment of the present invention. In the description of the third embodiment, the same reference numerals are used to designate the components corresponding to those of the first or second embodiment, and the explanation of the overlapped portions will be omitted.

As shown in FIG. 5, the linear vibrator 100*c* according to the third embodiment is characterized in that at least one annular depression 260 is formed in a circumferential inner surface of a casing 200 to more reliably prevent sidewall magnetic fluid 464 from sliding downwards due to its own weight.

That is, in the third embodiment, the annular depression 260 is formed in the circumferential inner surface of the casing 200 at a position corresponding to the subsidiary magnet 462, so that a contact surface area between the sidewall magnetic fluid 464 and the casing 200 is increased, thus more reliably preventing the sidewall magnetic fluid 464 from sliding downwards.

Meanwhile, in FIG. 5, although the annular depression 260 has been illustrated as being formed in the inner surface of only the casing 200, it may be formed in the outer surface of the auxiliary magnet 462, as necessary.

As described above, in a linear vibrator according to the present invention, an auxiliary magnet is provided in an outer portion of a weight. Hence, magnetic force of the auxiliary magnet is applied to a bracket made of a magnetic body, thus preventing undesirable fine vibration attributable to external force.

Furthermore, sidewall magnetic fluid for damping is interposed between an outer surface of a vibration unit and an inner surface of a casing, thereby preventing the vibration unit from coming into direct contact with the casing.

In addition, the sidewall magnetic fluid is applied to the sidewall of the auxiliary magnet, so that it can be prevented from sliding downwards due to its own weight.

As well, an annular depression is formed in the circumferential inner surface of the casing, thus more reliably preventing the sidewall magnetic fluid from sliding downwards due to its own weight.

Although the embodiments of the present invention have been disclosed for illustrative purposes, it will be appreciated that the linear vibrator of the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A linear vibrator with improved damping function, comprising:
    a casing defining an internal space therein;
    a bracket made of a magnetic body and coupled to a lower end of the casing, with a coil provided on the bracket to guide a magnetic field when a current is applied to the coil;
    a vibration unit, comprising a yoke having a hollow space therein, the yoke being closed on one end thereof, a magnet inserted into the hollow space of the yoke, an auxiliary magnet generating magnetic force with respect to the bracket and provided in a lower end of the weight, for preventing the vibration unit from undesirably finely vibrating in response to external force, and a weight fitted over an outer surface of the yoke; and
    a spring member provided in an upper end of the casing to elastically support the vibration unit such that the vibration unit linearly vibrates,
    wherein a sidewall magnetic fluid is interposed between the auxiliary magnet and the casing preventing the vibration unit from coming into direct contact with the casing due to horizontal movement or rotation of the vibration unit, and a force-fitting depression is formed in the perimeter of the lower end of the weight, and the auxiliary magnet is inserted into the force-fitting depression.

2. The linear vibrator with improved damping function as set forth in claim 1, wherein at least one annular depression is formed in a circumferential inner surface of the casing, so that the sidewall magnetic fluid is received into the annular depression.

3. The linear vibrator with improved damping function as set forth in claim 1, further comprising:
    a damper member provided on the bracket below the magnet to prevent the vibration unit from coming into direct contact with the bracket.

4. The linear vibrator with improved damping function as set forth in claim 1, wherein
    the spring member comprises a plate spring member fastened at an outer edge thereof to an upper end of the casing while a central portion thereof is spaced apart from the casing, and
    an upper magnetic fluid is applied to an upper surface of the spring member at a position corresponding to the magnet, the upper magnetic fluid being set in position by a leakage flux of the annular magnet.

5. The linear vibrator with improved damping function as set forth in claim 1, wherein the coil has a cylindrical shape such that the vibration unit linearly vibrates in the coil.

\* \* \* \* \*